US010862289B2

(12) United States Patent
Diop et al.

(10) Patent No.: US 10,862,289 B2
(45) Date of Patent: Dec. 8, 2020

(54) FLEXIBLE CABLE SPLICE

(71) Applicant: Hubbell Incorporated, Shelton, CT (US)

(72) Inventors: Seydou Diop, Birmingham, AL (US); Adrian Beau Candelaria, Alabaster, AL (US)

(73) Assignee: Hubbell Incorporated, Shelton, CT (US)

( * ) Notice: Subject to any disclaimer, the term of this patent is extended or adjusted under 35 U.S.C. 154(b) by 32 days.

(21) Appl. No.: 15/801,713

(22) Filed: Nov. 2, 2017

(65) Prior Publication Data

US 2018/0123335 A1    May 3, 2018

Related U.S. Application Data

(60) Provisional application No. 62/417,020, filed on Nov. 3, 2016.

(51) Int. Cl.
| | | |
|---|---|---|
| *H02G 7/05* | (2006.01) | |
| *F16G 11/04* | (2006.01) | |
| *H02G 15/115* | (2006.01) | |
| *H02G 1/14* | (2006.01) | |
| *F16G 11/08* | (2006.01) | |
| *H01R 4/26* | (2006.01) | |
| *H02G 15/18* | (2006.01) | |
| *H01R 4/70* | (2006.01) | |

(52) U.S. Cl.
CPC .............. *H02G 7/053* (2013.01); *F16G 11/04* (2013.01); *F16G 11/08* (2013.01); *H01R 4/26* (2013.01); *H02G 1/14* (2013.01); *H02G 15/115* (2013.01); *H02G 15/18* (2013.01); *H01R 4/70* (2013.01)

(58) Field of Classification Search
CPC ........ H02G 7/053; H02G 15/18; H02G 15/10; F16G 11/08; H01R 4/48; H01R 4/26
See application file for complete search history.

(56) References Cited

U.S. PATENT DOCUMENTS

| 649,542 A | 5/1900 | Nieman |
| 1,997,649 A | 4/1933 | Ohlund |
| 2,063,718 A * | 12/1936 | Berndt ..................... H01R 4/52 |
| | | 439/788 |

(Continued)

FOREIGN PATENT DOCUMENTS

| JP | H0582182 | 4/1993 |
| JP | H07326399 | 12/1995 |

(Continued)

OTHER PUBLICATIONS

PCT/US2017/059690 International Search Report and Written Opinion dated Apr. 13, 2018 (11 pages).

*Primary Examiner* — Paresh H Paghadal
(74) *Attorney, Agent, or Firm* — Michael Best & Friedrich, LLP

(57) ABSTRACT

A cable splice for overhead power transmission lines includes a flexible housing. A first casing is positioned in the flexible housing. The first casing is configured to receive and retain a first conductor. A second casing is positioned in the flexible housing. The second casing is configured to receive and retain a second conductor. A connecting member is connected to the first casing and the second casing. The first casing is moveable relative to the second casing.

15 Claims, 4 Drawing Sheets

(56) References Cited

U.S. PATENT DOCUMENTS

| | | | |
|---|---|---|---|
| 2,138,913 A | 12/1936 | Fotsch | |
| 2,128,832 A * | 8/1938 | Lusher | H01R 4/52 403/303 |
| 2,144,050 A | 1/1939 | Fotsch | |
| 2,166,458 A * | 7/1939 | Berndt | H01R 4/52 439/788 |
| 2,463,145 A | 3/1940 | Buchanan | |
| 2,199,283 A | 4/1940 | Rogoff | |
| 2,215,072 A | 9/1940 | Becker | |
| 2,217,978 A | 10/1940 | Buchanan | |
| 2,521,722 A | 9/1950 | Hubbell et al. | |
| 2,554,387 A | 5/1951 | Saul | |
| 2,572,940 A | 10/1951 | Lockhart | |
| 2,738,480 A | 3/1956 | Hubbard | |
| 2,740,178 A * | 4/1956 | Kellems | H02G 1/081 294/86.42 |
| 2,859,424 A | 11/1958 | Berndt | |
| 2,966,653 A | 12/1960 | Jugle | |
| 3,072,989 A | 1/1963 | Jugle et al. | |
| 3,136,844 A * | 6/1964 | Petersen | H01R 4/52 174/90 |
| 3,183,658 A | 5/1965 | Peterson | |
| 3,205,300 A | 9/1965 | Becker | |
| 3,241,204 A | 3/1966 | Baricevic et al. | |
| 3,315,457 A | 4/1967 | Stirn | |
| 3,345,454 A * | 10/1967 | Mixon, Jr. | H01R 4/08 174/84 R |
| 3,487,160 A | 12/1969 | Johnsen | |
| 3,681,512 A | 8/1972 | Werner et al. | |
| 3,689,866 A | 9/1972 | Kelley | |
| 3,852,850 A | 12/1974 | Filhaber | |
| 3,859,455 A | 1/1975 | Gommans et al. | |
| 4,084,067 A | 4/1978 | Gillemot | |
| 4,192,964 A | 3/1980 | Sacks | |
| 4,252,992 A | 2/1981 | Cherry et al. | |
| 4,292,732 A | 10/1981 | Tucci | |
| 4,362,352 A | 12/1982 | Hawkins | |
| 4,486,620 A | 12/1984 | Ball et al. | |
| 4,496,795 A | 1/1985 | Konnik | |
| 4,673,233 A | 6/1987 | Hertelendy | |
| 4,698,031 A * | 10/1987 | Dawson | F16G 11/08 439/863 |
| 4,810,829 A | 3/1989 | Rutenbeck et al. | |
| 4,985,598 A | 1/1991 | Bubica et al. | |
| 5,015,023 A | 5/1991 | Hall | |
| 5,039,193 A | 8/1991 | Snow | |
| 5,247,135 A | 9/1993 | Rebers et al. | |
| 5,278,353 A * | 1/1994 | Buchholz | H01R 4/52 174/84 R |
| 5,322,973 A | 6/1994 | Dagan | |
| 5,334,056 A | 8/1994 | Hlinsky | |
| 5,369,849 A | 12/1994 | DeFrance | |
| 5,401,175 A | 3/1995 | Guimond | |
| 5,445,533 A | 8/1995 | Rosciczewski et al. | |
| 5,486,388 A * | 1/1996 | Portas | H02G 15/18 138/129 |
| 5,547,404 A | 8/1996 | Nellis, Jr. et al. | |
| 5,600,096 A * | 2/1997 | Cherry | H01R 4/26 174/84 R |
| 5,683,273 A | 11/1997 | Garver et al. | |
| 5,980,284 A | 11/1999 | Ho et al. | |
| 6,206,736 B1 | 3/2001 | DeFrance et al. | |
| 6,247,943 B1 | 6/2001 | Moga et al. | |
| 6,359,228 B1 | 3/2002 | Strause et al. | |
| 6,773,311 B2 | 8/2004 | Mello et al. | |
| 6,796,854 B2 | 9/2004 | Mello et al. | |
| 7,160,142 B2 | 1/2007 | Hughes et al. | |
| 7,219,399 B2 | 5/2007 | Tamm et al. | |
| 7,256,348 B1 | 8/2007 | Endacott | |
| 7,361,045 B2 | 4/2008 | Vinciguerra et al. | |
| 7,799,996 B2 | 9/2010 | Tamm et al. | |
| 7,972,168 B2 | 7/2011 | Su | |
| 7,988,484 B1 | 8/2011 | Jacoby | |
| 8,069,521 B2 | 12/2011 | Beck et al. | |
| 8,221,155 B2 | 7/2012 | Luzzi | |
| 8,672,699 B2 | 3/2014 | Gaertner | |
| 8,674,230 B2 | 3/2014 | Hoxha | |
| 8,727,819 B2 | 5/2014 | Giefers et al. | |
| 9,054,445 B2 | 6/2015 | O'Sullivan et al. | |
| 9,054,446 B2 | 6/2015 | Sullivan | |
| 9,450,316 B2 | 9/2016 | Diop et al. | |
| 9,490,577 B2 | 11/2016 | Diop | |
| 2006/0108140 A1 | 5/2006 | Wiley | |
| 2007/0074378 A1 | 4/2007 | Tamm | |
| 2007/0238336 A1 | 10/2007 | Frederiksen et al. | |
| 2009/0215307 A1 | 8/2009 | Hughes | |
| 2009/0298358 A1 | 12/2009 | Tamm | |
| 2010/0193235 A1 | 8/2010 | Taylor et al. | |
| 2011/0002795 A1 | 1/2011 | Brookbank | |
| 2011/0034051 A1 | 2/2011 | Kumar | |
| 2011/0183539 A1 | 7/2011 | Gaertner | |
| 2012/0028498 A1 | 2/2012 | Na | |
| 2012/0217062 A1 | 8/2012 | Cawood et al. | |
| 2013/0011102 A1 | 1/2013 | Rinzler | |
| 2013/0081852 A1 | 4/2013 | Cawood | |
| 2013/0217250 A1 | 8/2013 | Melni | |
| 2013/0310745 A1 | 11/2013 | Latham | |
| 2014/0273575 A1 * | 9/2014 | O'Sullivan | H01R 13/62 439/271 |
| 2014/0273609 A1 | 9/2014 | Diop et al. | |
| 2015/0107875 A1 | 4/2015 | Diop et al. | |
| 2016/0006139 A1 | 1/2016 | Diop et al. | |

FOREIGN PATENT DOCUMENTS

| | | |
|---|---|---|
| JP | 2003346933 | 12/2003 |
| JP | 2006332012 | 12/2006 |
| WO | 2010114067 | 10/2010 |

\* cited by examiner

FLEXIBLE CABLE SPLICE

RELATED APPLICATION(S)

This application is based on provisional application Ser. No. 62/417,020, filed Nov. 3, 2016, the disclosure of which is incorporated herein by reference in its entirety and to which priority is claimed.

FIELD

Various exemplary embodiments relate to splices for connecting first and second cables, for example utility power transmission lines.

BACKGROUND

Splicing connectors may be used to join a variety of electrical conductors, including high-voltage power lines. Some splicing connectors allow a user to simply input two different conductors into the connector. Such splicing connectors, commonly referred to as automatic splices, may be used by utility linemen to quickly connect lengths of suspended cables during installation or repair of downed power lines.

An automatic splice typically includes a rigid housing having an opening on each axial end for receiving cables. After the cables are inserted, the housing includes clamps for maintaining the cables in a relative position. The automatic splice is then capable of conducting electricity from one cable to the other. Splices can be used to connect ends of cables in overhead distribution and transmission systems.

Typical overhead distribution systems utilize one or more cables or conductors supported by utility poles spanning large distances. Typically more than one cable reel is required during the stringing process, and the ends of the cables are connected by a splice. When running the cables along the poles, the cables are loosely positioned on the poles and then drawn to a certain amount of tension. Stringing blocks are often used to position and align the cables, and then draw the cables to the desired tension.

SUMMARY

According to an exemplary embodiment, a cable splice for overhead power transmission lines includes a flexible housing. A first casing is positioned in the flexible housing. The first casing is configured to receive and retain a first conductor. A second casing is positioned in the flexible housing. The second casing is configured to receive and retain a second conductor. A connecting member is connected to the first casing and the second casing. The first casing is moveable relative to the second casing.

According to another exemplary embodiment, a cable splice for overhead power transmission lines includes a plurality of cables forming a housing. A first casing is positioned in the flexible housing. The first casing is configured to receive and retain a first conductor. A second casing is positioned in the flexible housing. The second casing is configured to receive and retain a second conductor. A connecting member is connected to the first casing and the second casing. The first casing is moveable relative to the second casing.

According to another exemplary embodiment, a cable splice for overhead power transmission lines includes a plurality of cables forming a flexible housing. A first casing is positioned in the flexible housing and has a first interior cavity and a first opening for receiving a first conductor. A first jaw assembly is moveably positioned in the first interior cavity for retaining the first conductor in the first casing. A second casing is positioned in the flexible housing and has a second interior cavity and a second opening for receiving a second conductor. A second jaw assembly is moveably positioned in the second interior cavity for retaining the second conductor in second first casing. A connecting member is connected to the first casing and the second casing. The first casing is moveable relative to the second casing. The connecting member provides an electrical connection between the first conductor and the second conductor.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
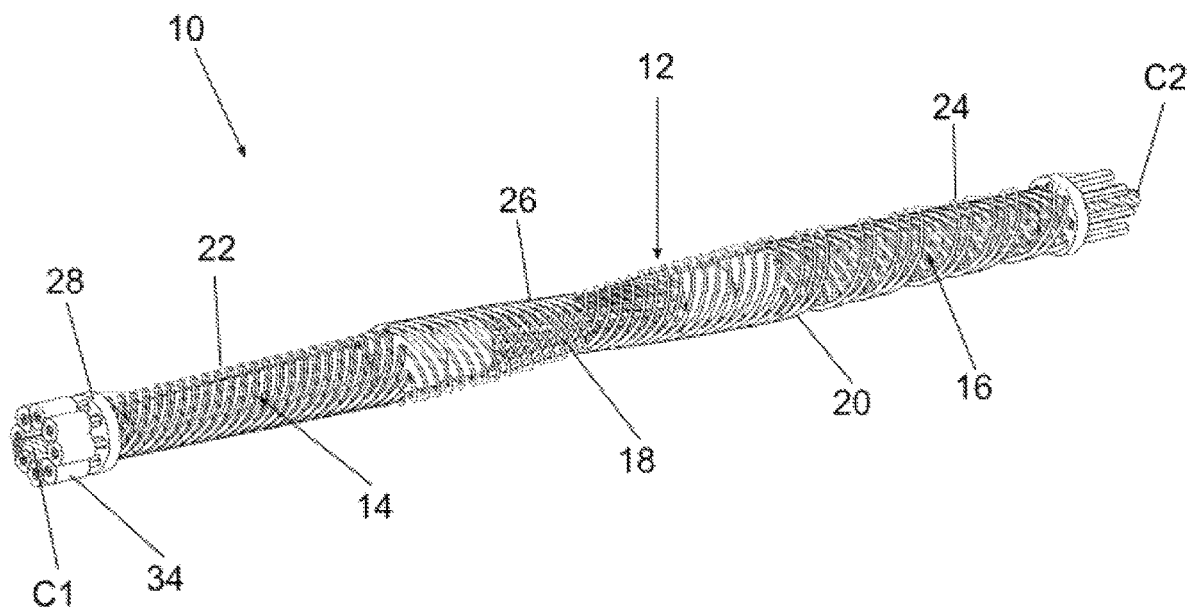
FIG. 1 is a perspective view of the exemplary flexible cable splice.

In accordance with an exemplary embodiment, a splice 10 includes a flexible housing 12 that contains a first casing 14, a second casing 16, and a connecting member 18 positioned between the first casing 14 and the second casing 16. The first casing 14 is configured to receive and retain a first cable or conductor C1 and the second casing 16 is configured to receive and retain a second cable or conductor C2. The assembled components are flexible, so the first casing 14 is moveable relative to the second casing 16, and the housing 12 is capable of moving with the first and second casings 14, 16. The housing 12 can be resilient, capable of allowing the first and second casings 14, 16 to move, but return to an initial position, for example the aligned position shown in FIG. 1, where the first and second casings 14, 16 are substantially coaxial.

Figure 2:
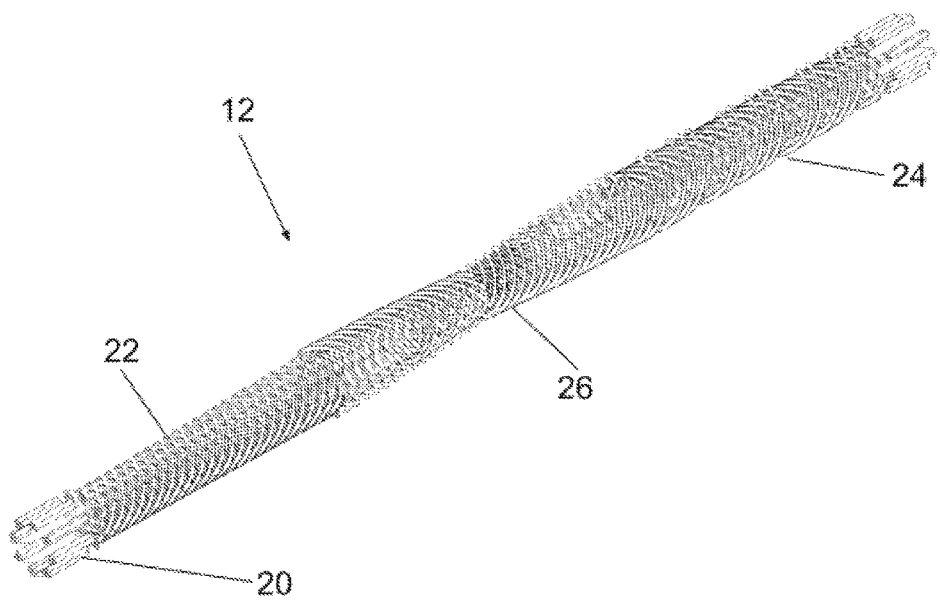
FIG. 2 is a perspective view of the flexible housing of FIG. 1.
Figure 3:
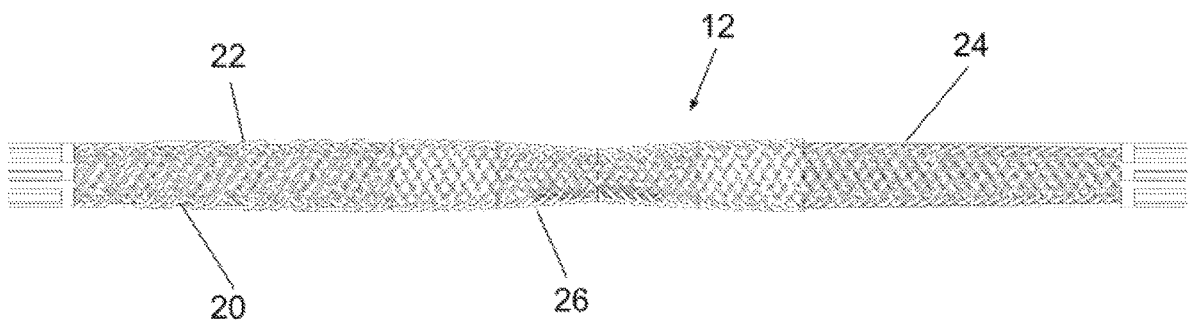
FIG. 3 is a side view of the flexible housing of FIG. 2.

According to the exemplary embodiment shown in FIGS. 1-3, the housing 12 includes a first section 22 containing the first casing 14, a second section 24 containing the second casing 16, and a central section 26 positioned between the first and second sections 22, 24. The central section 26 can narrow or taper from the first and second sections 22, 24 towards the middle of the housing 12. The housing 12 can be formed from or include one or a plurality of cables 20, wound together to provide support for the first and second casing 14, 16. In an exemplary embodiment, the cables are steel cables that help provide strength to the housing 12. Other forms of housing, including different shapes and materials may also be used.

Figure 4:
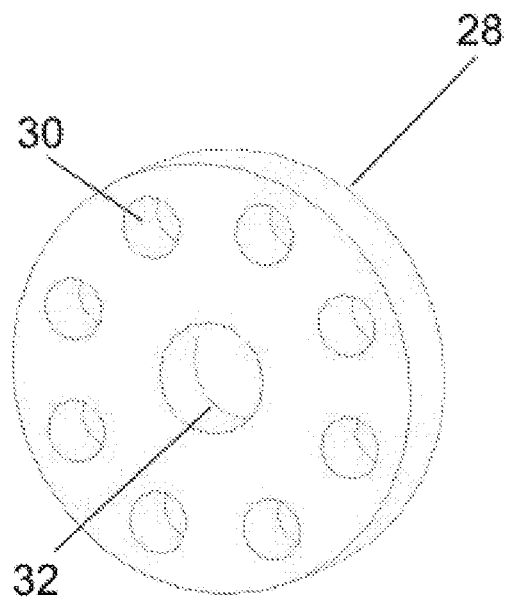
FIG. 4 is a perspective view of the coupling of FIG. 1.
Figure 5:
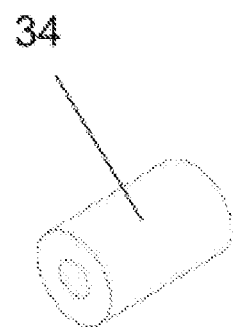
FIG. 5 is a perspective view of a ferrule of FIG. 1.
Figure 6:
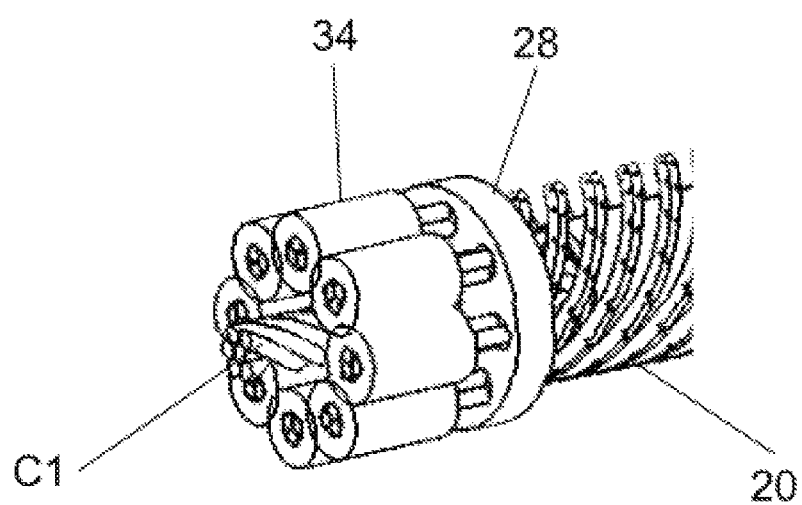
FIG. 6 is an enlarged view of the coupling and cables of FIG. 1.

The cables 20 can be formed from multiple strands that are wound along the length of the hosing 12 and through couplings 28 positioned at both ends of the housing 12. As best shown in FIGS. 4 and 6, the exemplary couplings 28 have a substantially cylindrical configuration with a set of outer openings 30 and a central opening 32. The outer openings 30 receive the strands of each cable 20. A ferrule 34 (FIG. 5) can be crimped or otherwise connected to the strands of each cable 20 to keep the ends together and prevent the cables 20 from being pulled through the coupling 28. The central opening 32 allows for passage of a cable C1, C2 or conductor through the coupling 28 and into the first casing 14.

Figure 7:
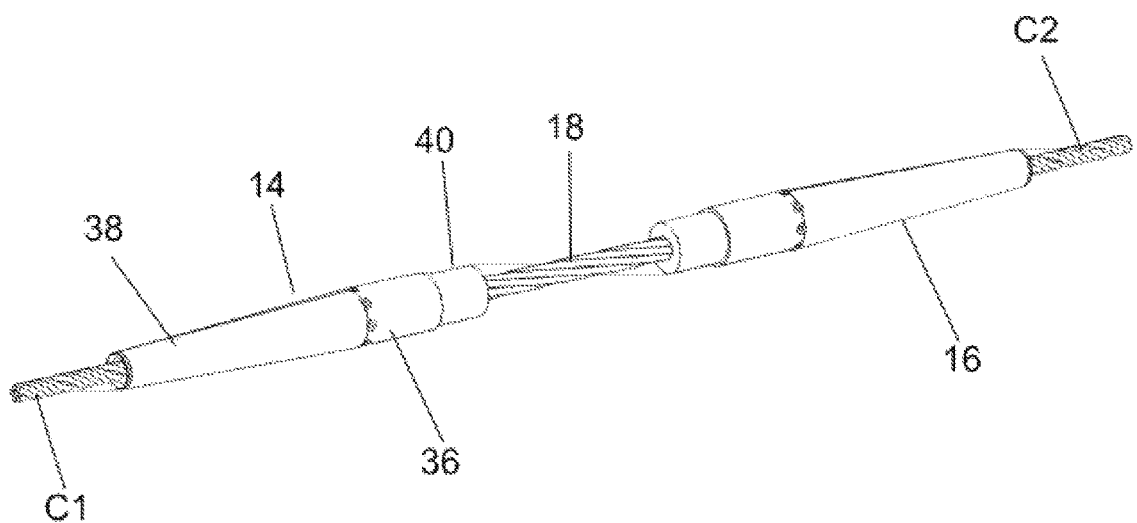
FIG. 7 is a perspective view of the flexible splice of FIG. 1 with the housing removed.
Figure 8:
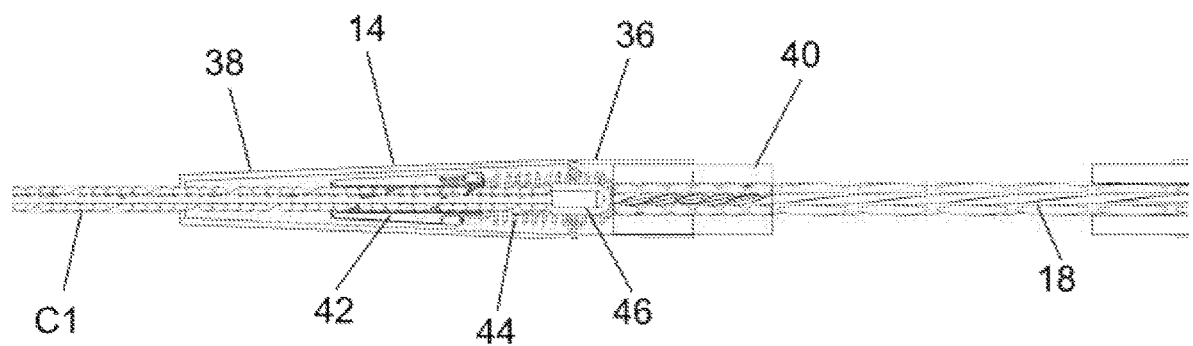
FIG. 8 is a sectional view of the first casing and the coupling member of FIG. 7.

FIGS. 7 and 8 show the first and second casings 14, 16 and the connecting member 18. Each casing includes a substantially tubular member 36 defining an internal cavity and an opening for receiving a cable C1. The tubular member 36 can include a swaged or tapered portion 38 extending toward the opening. End caps 40 extend at least partially into the first and second casings 14, 16, respectively, and retain the connecting member 18. In various exemplary embodiments, the end caps 40 are connected to the first and second casings 14, 16 through crimping, welding, mechanical fasteners, or other suitable method. The connecting member 18 forms a flexible connection between the first and second casings 14, 16. The connecting member 18 can also act as an electrical conductor between the first and second casings 14, 16 providing an electrical connection between the first and second cables C1, C2. In an exemplary embodiment the connecting member is a braided cable.

FIG. 8 shows the interior of the first casing 14. In the exemplary embodiment shown, the interior components of the first and second casings 14, 16 are identical, and only the first casing 14 is described. The first casing 14 includes a jaw assembly 42, a biasing member 44, and a pilot cup 46. In an exemplary embodiment, the jaw assembly 42 includes first and second jaw members (one shown). The jaw members have a front jaw surface, a rear jaw surface, and a jaw body extending therebetween. The jaw body has an arcuate outer surface and an inner surface. At least a portion of the jaw body has a semi-funnel-shape, tapering towards the front jaw surface. This taper is similar to or corresponds to the taper of the inner casing surface, allowing the jaw members to slide within the interior cavity of the casing 14. At least a portion of the jaw body inner surface contains a series of teeth. The teeth may have any shape, pitch, length, width, or spacing. In the exemplary embodiment, the teeth extend from the inner surface at an angle towards the rear jaw surface.

The jaw members include one or more radially extending projections and one or more corresponding openings. The projections and openings may have a variety of sizes or shapes. The projections and openings are staggered, so that a single part may be used for the upper jaw member and the lower jaw member. When placed together, the projections from the upper jaw member will mate with the openings of the lower jaw member and vice versa. This mating relationship couples the upper jaw member to the lower jaw member to prevent one jaw member from moving axially relative to the other jaw, ensuring substantially uniform axial movement between the jaw members. The projections extend radially inwardly and have a length preventing disengagement as the jaw members are moved radially away from one another by being pushed towards the central region, but also prevents the projections from interfering with movement of the jaw members as they are biased towards the opening in the casing.

The biasing member 44 has a first end for contacting the rear jaw surface and a second end for contacting the end cap 40. In the exemplary embodiment shown, the biasing member 44 is a coil spring having coils at each end that are touching or otherwise spaced closer together than the other coils. The biasing member 44 may be other devices or materials, and the outer diameter, wire diameter, pitch, length and material type of the spring may be varied depending on the application.

The pilot cup 46 has a cylindrical outer surface with an open first end and a semi-spherical, closed second end, although a variety of shapes, sizes, and configurations may be used. The pilot cup 46 receives the cable to assist in passing the cable through the jaw assembly.

Other components and configurations of splices or automatic splices can be incorporated into the flexible splice 10 as would be understood by one of ordinary skill in the art.

In operation, the loading positing of the first casing 14 can be with the pilot cup 46 initially positioned in the jaw assembly 42 or the pilot cup 46 connected to the end of the cable C1. When the pilot cup 46 is positioned in the jaw assembly 42, the pilot cup 42 can hold the first and second jaw members apart and the biasing member 44 can be compressed. As a cable C1 is inserted into the casing 14, the cable C1 engages the pilot cup 46, moving it past the jaw assembly 42. When the pilot cup 46 clears the jaw assembly 42, the jaw members are released and are biased toward the front of the casing 14 by the biasing member 44. The jaw assembly 42 then engages the conductor C1 in the terminated position. When the pilot cup 46 is initially connected to the conductor, it can be inserted into the casing 14, pushing the jaw assembly 42 back and open until the pilot cup 46 clears through the center of the jaw assembly 42 and the jaw members are biased forward toward the terminated position.

The flexible splice 10 provides a physical and electrical connection between the two conductors C1, C2. When using stringing blocks to install conductors along a power distribution and transmission lines, the conductor at the outlet is often offset at angle to the conductor at the inlet. A rigid splice often cannot make the required angle transition, causing limitations and complications in installing conductors. The flexible splice 10 is more easily run through a stringing block and capable of making angled transitions between the inlet and the outlet of the stringing block.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

The invention claimed is:

1. A cable splice for overhead power transmission lines comprising:
   a flexible housing comprising a plurality of cables forming a first section, a second section, and a central section positioned between the first and second sections, wherein the central section is narrower than the first section and the second section;
   a coupling positioned at a first end of the flexible housing, the coupling having a plurality of openings respectively receiving the plurality of cables;
   a first casing positioned in the first section of the flexible housing, the first casing configured to receive and retain a first conductor;
   a first end cap positioned in the flexible housing;
   a second casing positioned in the second section of the flexible housing, the second casing configured to receive and retain a second conductor;
   a second end cap positioned in the flexible housing; and
   a connecting member connected to the first casing and the second casing,
   wherein the first casing is moveable relative to the second casing, and
   wherein the first end cap is formed separately from and securely engages both the first casing and the connecting member and the second end cap is formed separately from and securely engages both the second casing and the connecting member.

2. The cable splice of claim 1, wherein the connecting member is flexible.

3. The cable splice of claim 1, wherein the connecting member electrically connects the first casing and the second casing.

4. The cable splice of claim 1, wherein a first jaw assembly and a first biasing member are positioned in the first casing and a second jaw assembly and a second biasing member positioned in the second casing.

5. A cable splice for overhead power transmission lines comprising:
   a plurality of cables forming a flexible housing including a first section, a second section, and a central section positioned between the first and second sections, wherein the central section is narrower than the first section and the second section;
   a first casing positioned in the first section of the flexible housing, the first casing configured to receive and retain a first conductor;
   a first end cap positioned in the flexible housing;
   a second casing positioned in the second section of the flexible housing, the second casing configured to receive and retain a second conductor;
   a second end cap positioned in the flexible housing; and
   a connecting member connected to the first casing and the second casing,
   wherein the first casing is moveable relative to the second casing, and
   wherein the first end cap is formed separately from and securely engages both the first casing and the connecting member and the second end cap is formed separately from and securely engages both the second casing and the connecting member.

6. The cable splice of claim 5, wherein the plurality of wound cables form a resilient housing.

7. The cable splice of claim 5, wherein the connecting member is a flexible cable.

8. The cable splice of claim 5, wherein a first jaw assembly and a first biasing member are positioned in the first casing and a second jaw assembly and a second biasing member positioned in the second casing.

9. The cable splice of claim 5, further comprising a coupling positioned at a first end of the flexible housing, the coupling having a plurality of outer openings respectively receiving the plurality of cables.

10. The cable splice of claim 9, wherein the coupling includes a central opening for receiving the first conductor.

11. The cable splice of claim 9, further comprising a ferrule connected to each cable.

12. A cable splice for overhead power transmission lines comprising:
    a plurality of cables forming a flexible housing including a first section, a second section, and a central section positioned between the first and second sections, wherein the central section is narrower than the first section and the second section;
    a coupling positioned at a first end of the flexible housing, the coupling having a plurality of outer openings respectively receiving the plurality of cables;
    a first casing positioned in the first section of the flexible housing and having a first interior cavity and a first opening for receiving a first conductor;
    a first end cap positioned in the flexible housing;
    a first jaw assembly moveably positioned in the first interior cavity for retaining the first conductor in the first casing;
    a second casing positioned in the second section of the flexible housing and having a second interior cavity and a second opening for receiving a second conductor;
    a second end cap positioned in the flexible housing;
    a second jaw assembly moveably positioned in the second interior cavity for retaining the second conductor in the second casing;
    a connecting member connected to the first casing and the second casing,
    wherein the first casing is moveable relative to the second casing and the connecting member provides an electrical connection between the first conductor and the second conductor, and
    wherein the first end cap is formed separately from and securely engages both the first casing and the connecting member and the second end cap is formed separately from and securely engages both the second casing and the connecting member.

13. The cable splice of claim 12, wherein the plurality of cables are wound in a spiral configuration.

14. The cable splice of claim 12, wherein a first biasing member is positioned in the first casing to bias the first jaw assembly toward the first opening.

15. The cable splice of claim 12, wherein the connecting member is flexible.

* * * * *